US012807757B2

(12) United States Patent
Dusselier et al.

(10) Patent No.: US 12,807,757 B2
(45) Date of Patent: Nov. 24, 2026

(54) HIGH MELT STRENGTH POLYLACTIC ACID POLYMERS

(71) Applicant: Katholieke Universiteit Leuven, Leuven (BE)

(72) Inventors: Michiel Dusselier, Pellenberg (BE); Peter Van Puyvelde, Heverlee (BE); An Sofie Narmon, Humbeek (BE); Annelies Dewaele, Hasselt (BE); Bert Sels, Westerlo (BE)

(73) Assignee: Katholieke Universiteit Leuven, Leuven (BE)

( * ) Notice: Subject to any disclaimer, the term of this patent is extended or adjusted under 35 U.S.C. 154(b) by 783 days.

(21) Appl. No.: 18/245,994

(22) PCT Filed: Sep. 21, 2021

(86) PCT No.: PCT/EP2021/075980
§ 371 (c)(1),
(2) Date: Mar. 20, 2023

(87) PCT Pub. No.: WO2022/058623
PCT Pub. Date: Mar. 24, 2022

(65) Prior Publication Data

US 2024/0026070 A1 Jan. 25, 2024

(30) Foreign Application Priority Data

Sep. 21, 2020 (EP) .................................... 20197312

(51) Int. Cl.
*C08G 63/08* (2006.01)

(52) U.S. Cl.
CPC ......... *C08G 63/08* (2013.01); *C08G 2230/00* (2013.01)

(58) Field of Classification Search
CPC ... C08G 63/08; C08G 2230/00; C08G 18/428
See application file for complete search history.

(56) References Cited

U.S. PATENT DOCUMENTS

2017/0240696 A1* 8/2017 Gobius Du Sart .... C08G 63/08

OTHER PUBLICATIONS

Narmon et al Boosting PLA melt strength by controlling the chirality of co-monomer incorporation, Chem. Sci., 2021, 12, 5672-5681, published Mar. 10, 2021.*
International Search Report mailed Nov. 17, 2021 in reference to co-pending European Application No. PCT/EP2021/075980 filed Sep. 21, 2021.
Written Opinion mailed Nov. 17, 2021 in reference to co-pending European Application No. PCT/EP2021/075980 filed Sep. 21, 2021.
Auras, et al., "Synthesis, Structures, Properties, Processing, and Applications", Biology of Poly(Lactic Acid), pp. 124-139, 2010.
Chile, et al., "A Comparison of the Rheological and Mechanical Properties of Isotactic, Syndiotactic, and Heterotactic Poly(lactide)", Macromolecules, vol. 49, pp. 909-919, 2016.
Cooper-White, et al., "Rheological Properties of Poly(lactides). Effect of Molecular Weight and Temperature on the Viscoelasticity of Poly(I-lactic acid)", Journal of Polymer Science, Part B, vol. 37, pp. 1803-1814, 1999.
Corre, et al., "Melt strengthening of poly (lactic acid) through reactive extrusion with epoxy-functionalized chains", Rheol Acta, vol. 50, pp. 613-629, 2011.
Dorgan, et al., "Melt rheology of variable L-content poly(lactic acid)", The Society of Rheology, Inc., J. Rheol., vol. 49, No. 3, pp. 607-619, May/Jun. 2005.
Cailloux, et al., "Using viscoelastic properties to quantitatively estimate the amount of modified poly(lactic acid) chains through reactive extrusion", The Society of Rheology, Inc., J. Rheol., vol. 59, No. 5, pp. 1191-1227, Sep./Oct. 2015.
Dusselier, et al., "Shape-slective zeolite catalysis for bioplastics production", Green Chemistry, vol. 349, Issue 6243, pp. 78-80, Jul. 3, 2015.
Fox, et al., "Isothermal Viscosity-Molecular Weight Dependence for Long Polymer Chains", Journal of Applied Physics, vol. 26, pp. 1080-1082, 1955.
Garlotta, "A Literature Review of Poly(Lactic Acid)", Journal of Polymers and the Environment, vol. 9, No. 2, pp. 63-84, Apr. 2001.
Gu, et al., "Star vs long chain branching of poly(lactic acid) with multifunctional aziridine", Journal of Rheology, vol. 61, pp. 785-796, 2017.
Hedegaard, et al., "Effect of extensional viscosity on cocontinuity of immiscible polymer blends", Journal of Rheology, vol. 59, pp. 1397-1417, 2015.
Niguez-Franco, et al., "Control of hydrolytic degradation of Poly(lactic acid) by incorporation of chain extender: From bulk to surface erosion", Polymer Testing, vol. 67, pp. 190-196, 2018.
Jing, et al., "A Bifunctional Monomer Derived from Lactide for Toughening Polylactide", JACS Communications, vol. 130, pp. 13826-13827, 2008.
Kaihara, et al., "Synthesis of poly(L-lactide) and polyglycolide by ring-opening polymerization", Protocol, vol. 2, No. 11, pp. 2767-2771, 2007.
Lim, et al., "Processing technologies for poly(lactic acid)", Progress in Polymer Science, vol. 33, pp. 820-852, 2008.
Limsukon, et al., "Hydrolytic degradation and lifetime prediction of poly(lactic acid) modified with a multifunctional epoxy based chain extender", Polymer Testing, vol. 80, pp. 1-13, 2019.
Nofar, et al., "Rheology of poly (lactic acid)-based systems", Polymer Reviews, vol. 59, No. 1, pp. 465-509, 2019.
Othman, "Solution and melt viscoelastic properties of controlled microstructure poly(lactide)", The Society of Rheology, Inc., vol. 55, No. 5, pp. 987-1005, 2011.
Palade, et al., "Melt Rheology of High L-Content Poly(lactic acid)", Macromolecules, vol. 34, pp. 1384-1390, 2001.

(Continued)

*Primary Examiner* — Gregory Listvoyb
(74) *Attorney, Agent, or Firm* — DINSMORE & SHOHL LLP

(57) ABSTRACT

The invention relates to methods for producing a lactic acid based polymer, which comprises co-polymerisation of lactide with cyclic dimer of another α-hydroxy-acid as co-monomer of opposite α-carbon chirality.

18 Claims, 9 Drawing Sheets

(56) References Cited

OTHER PUBLICATIONS

Saiyasombat, et al., "Ring strain and polymerizability of cyclic esters", Polymer Papers, vol. 39, No. 23, pp. 5581-5585, 1998.
Teimaille, et al., "Synthesis and Ring-Opening Polymerization of New Monoalkyl-Substituted Lactides", Journal of Polymer Science, Part A, vol. 42, pp. 4379-4391, 2004.
Tsuji, et al., "Cocrystallization of monomer units in lactic acid-based biodegradable copolymers, poly(L-lactic acid-co-L-2-hydroxybutanoic acid)s", Polymer, vol. 72, pp. 202-211, 2015.
Tsuji, et al., "Heterostereocomplexation between Biodegradable and Optically Active Polyesters as a Versatile Preparation Method for Biodegradable Materials", Biomacromolecules, vol. 11, pp. 252-258, 2010.
Tsuji, et al., "Hetero-stereocomplex formation of stereoblock copolymer of substituted and non-substituted poly (lactide)s", Polymer, vol. 52, pp. 1318-1325, 2011.
Yamane, et al., "Poly(D-lactic acid) as a rheological modifier of poly(L-lactic acid): Shear and biaxial extensional flow behavior", The Society of Rheology, Inc., vol. 48, No. 3, pp. 599-609, May/Jun. 2004.
Yin, et al., "Preparation and Characterization of Substituted Polylactides", Macromolecules, vol. 32, No. 23, pp. 7711-7718, Nov. 16, 1999.

* cited by examiner

HIGH MELT STRENGTH POLYLACTIC ACID POLYMERS

CROSS REFERENCES TO RELATED APPLICATIONS

This application is a national-stage application under 35 U.S.C. § 371 of International Application No. PCT/EP2021/075980, filed Sep. 21, 2021, which International Application claims benefit of priority to European Patent Application No. 20197312.0, filed Sep. 21, 2020.

FIELD OF THE INVENTION

The invention concerns boosting polylactic acid (PLA) polymer melt strengths by random incorporation of small amounts of hydroxy-acid co-monomers with opposite alpha-carbon chirality, and the use of said polymers.

BACKGROUND OF THE INVENTION

Development of sustainable and renewable materials has become an essential part of the plastics industry due to today's growing environmental concerns. As a consequence, bio-based and biodegradable polymers, such as poly(lactic acid), have become prominent.

In spite of other promising features, PLA lacks decent melt properties, i.e. it has low melt strength, melt viscosity and melt elasticity, resulting in processing limitations and challenges that must be tackled to create a commercially competitive biobased material, similar or superior to existing petroleum-derived plastics.

Thus, there is a need in the art for improved PLA polymers.

SUMMARY OF THE INVENTION

Development of sustainable and renewable materials has become an essential part of the plastics industry due to today's growing environmental concerns. As a consequence, bio-based and biodegradable polymers, such as poly(lactic acid), have become prominent. In spite of other promising features, PLA lacks decent melt properties, i.e. it has low melt strength, melt viscosity and melt elasticity, resulting in processing limitations and challenges that must be tackled to create a commercially competitive biobased material, similar or superior to existing petroleum-derived plastics.

The present invention demonstrates a significant increase in melt shear viscosity and elasticity as well as a rise in elongational viscosity and melt strength of PLA by random co-polymerisation of lactide with small amounts (0.4-10 mol %) of diethylglycolide of opposite chiral nature. Both monomers can be synthesized via a one-step zeolite catalysed process in high yields and enantiomeric purity. Both melt strength improvement and the efficient and enantiomerically pure monomer syntheses could result in a more cost-competitive and sustainable biomaterial while broadening its applicability.

The present invention solves the problems of the related art, as unexpected improvements of melt viscosity and elasticity of PLA by co-polymerisation of the classic monomer with a small amount of co-monomer with reverse stereochemistry were discovered. Both enantiomerically pure monomers can be easily synthesized using a one-step zeolite-catalysed process. The poor melt strength of PLA limits its processability when strong extensional forces are applied on the polymer, e.g. when making bottles via blow moulding, or in film blowing, fibre spinning and foaming. A stronger melt can translate in less plastic usage per item, lowering its overall footprint. Improved elasticity and melt strength by adding a bit of co-monomer could thus pave the way towards a more ecological and cost-competitive usage of PLA bioplastics with broader processing and application windows. Both the melt strength improvement and the use of enantiomerically pure monomers access to this more cost-competitive and sustainable PLA-based biomaterials with a broader application window.

In accordance with the purpose of the invention, as embodied and broadly described herein, the invention is broadly drawn to random incorporation of small amounts of α-hydroxy-acid co-monomers with opposite α-carbon chirality to boost polylactic acid (PLA) polymer melt strengths, and the use of said polymers. This effect was successfully reproducible when scaling-up the reaction. An easy way for incorporating the co-monomers relies on ring-opening polymerisation protocols of the cyclic dimers of said hydroxy-acids. In addition, Extensional viscosity measurements confirmed the presumption of the melt strength improving effect of copolymerising the right diethylglycolide. A large scale co-polymer of (L,L)-lactide with (D,D)-diethylglycolide (1.2 mol %) exhibited both a higher extensional viscosity and a higher extensional force in comparison with L-PLA and a commercial grade PLA (Ingeo 7001D) used for injection stretch blow moulding applications.

In one aspect of the invention, the one-step conversion of (2-or) α-hydroxybutyric acid in the presence of zeolite H-BEA toward diethylglycolide resulted in high yields and enantiomeric purity. This enantiomerically pure cyclic ester gave access to a range of unexplored high-molecular weight, random co-polymers with lactide, exhibiting attractive new melt properties. Small amounts (0.4-10 mol %) of diethylglycolide of opposite chiral nature compared to lactide resulted in polymer materials with a significantly increased melt shear viscosity and melt elasticity compared to L-PLA.

Another aspect of the invention is a method of improving effects in PLA in absence of chain extenders, blending, compounding or stereocomplexation.

Still another aspect of the invention, is a new pathway towards high melt strength materials via co-polymerisation.

Some aspects of the invention are set forth in statement format directly below:

1. A method for producing a lactic acid based polymer, which comprises co-polymerisation of lactide with cyclic dimer of another α-hydroxy-acid as co-monomer of opposite α-carbon chirality.
2. The method according to statement 1, characterised in that the co-polymerisation of lactide with α-hydroxy-acid is a random co-polymerisation.
3. The method according to statement 1, characterised in that the co-polymerisation is a (L,L)-lactide with (D,D)-diethylglycolide or of (D,D)-lactide with (L,L)-diethylglycolide co-polymerisation
4. The method according to statement 1, characterised in that the co-polymerisation is a (L,L)-lactide with (D,D)-diethylglycolide or of (D,D)-lactide with (L,L)-diethylglycolide co-polymerisation into poly(lactic-co-α-hydroxybutyric acid).
5. The method according to any one of statements 1 to 4, wherein lactide is co-polymerised with 0.2-10 mol % of a cyclic dimer of another α-hydroxy-acid as co-monomer of opposite α-carbon chirality.
6. The method according to any one of statements 1 to 4, wherein lactide is co-polymerised with 0.4-5 mol % of a cyclic dimer of another α-hydroxy-acid as co-monomer of opposite α-carbon chirality.

7. The method according to any one of statements 1 to 4, wherein lactide is co-polymerised with 0.7-2 mol % of a cyclic dimer of another α-hydroxy-acid as co-monomer of opposite α-carbon chirality.
8. Copolymer obtainable by process according to any one of statements 1 to 7.
9. Copolymer obtainable by process according to any one of statements 1 to 7, characterized in that it exhibits an extensional force that is at least 1.5 times higher than that of a pure PLA obtained by polymerisation of lactide.
10. Copolymer obtainable by process according to any one of statements 1 to 7, characterized in that it exhibits an extensional force that is at least 2 times higher that of a pure PLA obtained by polymerisation of lactide.
11. Copolymer obtainable by process according to any one of statements 1 to 7, characterized in that it exhibits a zero-shear viscosity (as measured at 185° C., applying a strain amplitude of 1 to 10% and dynamic frequencies ranging from 0.1 to 100 rad s-1 and calculated by using a Carreau-Yasuda model fit) that is at least 1.2 times higher that of a co-polymerisation of lactide with a cyclic dimer of another α-hydroxy-acid as co-monomer of the same α-carbon chirality.
12. Copolymer obtainable by process according to any one of statements 1 to 7, characterized in that it exhibits an extensional force of at least 17 N newton (N) (as measured by the force of the melt at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$).
13. Copolymer obtainable by process according to any one of statements 1 to 7, characterized in that it exhibits a zero-shear viscosity of at least 15 kPa s (as measured at 185° C., applying a strain amplitude of 1 to 10% and dynamic frequencies ranging from 0.1 to 100 rad $s^{-1}$ and calculated by using a Carreau-Yasuda model fit).
14. Copolymer obtainable by process according to any one of statements 1 to 7, characterized in that it exhibits an extensional force of 15 to 41 newton (N), preferably 23-25.5 N (as measured by the force of the melt at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$)
15. Copolymer obtainable by process according to any one of statements 1 to 7, characterized in that it exhibits a zero-shear viscosity of 15 to 200 kPa s (as measured at 185° C., applying a strain amplitude of 1 to 10% and dynamic frequencies ranging from 0.1 to 100 rad $s^{-1}$ and calculated by using a Carreau-Yasuda model fit).
16. A copolymer obtained by a random co-polymerisation of lactide with a cyclic dimer of another α-hydroxy-acid as co-monomer with opposite α-carbon chirality, characterized in that it has a melt strength (as measured by the force of the melt at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$)) of at least 15 and preferably at least 20 newton (N) comprising from 90 to 99.6 mol percent of lactic acid and comprising from 10 to 0.4 mol percent of hydroxy-acid co-monomer or characterized in that it has a melt strength (as measured by the force of the melt at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$)) of 15 to 40 N, preferably 20 to 35 N, more preferably 23-25.5 N comprising from 90 to 99.6 mol percent of lactic acid and comprising from 10 to 0.4 mol percent of hydroxy-acid co-monomer.

Yet some aspects of the invention are set forth in statement format directly below:

1. A poly(lactic-co2-hydroxybutyric acid) obtained by a random co-polymerisation of a (L,L)-lactide with (D,D)-diethylglycolide and/or of (D,D)-lactide with (L,L)-diethylglycolide, characterized in that it has a melt strength (as measured at 185° C.) of at least 15 and preferably at least 20 N comprising from 90 to 99.6 mol percent of lactic acid and comprising from 10 to 0.4 mol percent of diethylglycolide.
2. The poly(lactic-co-2-hydroxybutyric acid) according to statement 1, characterized in that random co-polymerisation of the lactide is with 0.2-10 mol % diethylglycolide.
3. The poly(lactic-co-2-hydroxybutyric acid) according to statement 1, characterized in that it has a melt strength (as measured by the force of the melt at 185° C.) of 15 to 40 N, preferably 20 to 35 N, more preferably 23-25.5 N, comprising from 90 to 99.6 mol percent of lactic acid and comprising from 10 to 0.4 mol percent of diethylglycolide
4. The poly(lactic-co-2-hydroxybutyric acid) according to statement 1, characterized in that it exhibits a force that is at least 1.5 times higher than polylactic acid obtained from lactide polymerisation or poly(lactic-co-2-hydroxybutyric acid) obtained of co-polymerisation lactide with diethylglycolide of the same α-carbon chirality.
5. The poly(lactic-co-2-hydroxybutyric acid) according to statement 1, characterized in that it exhibits a force that is at least 2 times higher than polylactic acid obtained from lactide polymerisation or poly(lactic-co-2-hydroxybutyric acid) obtained of co-polymerisation lactide with diethylglycolide of the same α-carbon chirality.
6. The poly(lactic-co-2-hydroxybutyric acid) according to any of the previous statements 1 to 5, characterized in that it exhibits a force of at least 15 N (as measured by the force of the melt at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$).
7. The poly(lactic-co-2-hydroxybutyric acid) according to any of the previous statements 1 to 5, characterized in that it exhibits a zero-shear viscosity of at least 15 kPa s (as measured at 185° C., applying a strain amplitude of 1 to 10% and dynamic frequencies ranging from 0.1 to 100 rad $s^{-1}$ and calculated by using a Carreau-Yasuda model fit).
8. The poly(lactic-co-2-hydroxybutyric acid) according to any of the previous statements 1 to 5, characterized in that it exhibits a force of 17 to 35 newton (N), preferably 23-25.5 N (as measured by the force of the melt at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$)
9. The poly(lactic-co-2-hydroxybutyric acid) according to any of the previous statements 1 to 5, characterized in that it exhibits a zero-shear viscosity of 15 to 200 kPa s (as measured at 185° C., applying a strain amplitude of 1 to 10% and dynamic frequencies ranging from 0.1 to 100 rad $s^{-1}$ and calculated by using a Carreau-Yasuda model fit).

Yet some embodiments of the invention are set forth in statement format directly below:

1. A copolymer, obtainable by co-polymerisation of lactide with a cyclic dimer of another α-hydroxy-acid (=2-hydroxy-acid) as co-monomer of opposite α-carbon chirality.
2. Copolymer according to statement 1, obtainable by co-polymerisation of lactide with 0.2-10 mol % of a cyclic dimer of another α-hydroxy-acid as co-monomer of opposite α-carbon chirality.
3. Copolymer according to statement 1, obtainable by polymerisation of lactide with 0.4-5 mol % of a cyclic dimer of another α-hydroxy-acid as co-monomer of opposite α-carbon chirality.
4. Copolymer according to statement 1, obtainable by co-polymerisation of lactide with 0.7-2 mol % of a cyclic dimer of another α-hydroxy-acid as co-monomer of opposite α-carbon chirality.
5. Copolymer according to statement 1, characterised in that the co-polymerisation of lactide with α-hydroxy-acid is a random co-polymerisation.
6. Copolymer according to statement 1, characterised in that the co-polymerisation is a (L,L)-lactide with (D,D)-diethylglycolide or of (D,D)-lactide with (L,L)-diethylglycolide co-polymerisation
7. Copolymer according to statement 1, characterised in that the co-polymerisation is a (L,L)-lactide with (D,D)-diethylglycolide or of (D,D)-lactide with (L,L)-diethylglycolide co-polymerisation into poly(lactic-co-2-hydroxybutyric acid).
8. Copolymer according to any of the previous statements 1 to 7, characterized in that it exhibits a force that is at least 1.5 times higher than co-polymer made from of lactide with a cyclic dimer of another α-hydroxy-acid as co-monomer of the same α-carbon chirality.
9. Copolymer according to any of the previous statements 1 to 7, characterized in that it exhibits a force that is at least 2 times higher than co-polymer made of lactide with a cyclic dimer of another α-hydroxy-acid as co-monomer of the same α-carbon chirality.
10. Copolymer according to any of the previous statements 1 to 7, characterized in that it exhibits a force of at least 17 N (as measured at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$) and characterized in that it exhibits a zero-shear viscosity of at least 15 kPa s (as measured at 185° C., applying a strain amplitude of 1 to 10% and dynamic frequencies ranging from 0.1 to 100 rad $s^{-1}$ and calculated by using a Carreau-Yasuda model fit).

Yet some embodiments of the invention are set forth in statement format directly below:

1. A lactic acid based polymer, characterised in that the polymer comprises a co-polymerisation of lactide with 0.2-10 mol % of a cyclic dimer of another α-hydroxy-acid as co-monomer of opposite α-carbon chirality.
2. The polymer according to embodiment 1, characterised in that the polymer comprises a co-polymerisation of lactide with 0.4-5 mol % of a cyclic dimer of another α-hydroxy-acid as co-monomer of opposite α-carbon chirality.
3. The polymer according to embodiment 1, characterised in that the polymer comprises a co-polymerisation of lactide with 0.7-2 mol % of a cyclic dimer of another α-hydroxy-acid as co-monomer of opposite α-carbon chirality.
4. The polymer according to embodiment 1, characterised in that the polymer essentially consists of a co-polymerisation of lactide with 0.2-10 mol % of a cyclic dimer of another α-hydroxy-acid as co-monomer of opposite α-carbon chirality.
5. The polymer according to embodiment 1, characterised in that the polymer essentially consists of a co-polymerisation of lactide with 0.4-5 mol % of a cyclic dimer of another α-hydroxy-acid as co-monomer of opposite α-carbon chirality.
6. The polymer according to embodiment 1, characterised in that the polymer essentially consists of a co-polymerisation of lactide with 0.7-2 mol % of a cyclic dimer of another α-hydroxy-acid as co-monomer of opposite α-carbon chirality.
7. The polymer according to embodiment 1, characterised in that the polymer consists of a co-polymerisation of lactide with 0.2-10 mol % of a cyclic dimer of another α-hydroxy-acid as co-monomer of opposite α-carbon chirality.
8. The polymer according to embodiment 1, characterised in that the polymer consists of a co-polymerisation of lactide with 0.4-5 mol % of a cyclic dimer of another α-hydroxy-acid as co-monomer of opposite α-carbon chirality.
9. The polymer according to embodiment 1, characterised in that the polymer consists of a co-polymerisation of lactide with 0.7-2 mol % of a cyclic dimer of another α-hydroxy-acid as co-monomer of opposite α-carbon chirality.
10. The polymer according to any one of the embodiments 1 to 9, characterised in that the co-polymerisation of lactide with α-hydroxy-acid is a random co-polymerisation.
11. The polymer according to any one of the embodiments 1 to 9, characterised in that the co-polymerisation is a (L,L)-lactide with (D,D)-diethylglycolide or of (D,D)-lactide with (L,L)-diethylglycolide co-polymerisation
12. The polymer according to any one of the embodiments 1 to 9, characterised in that the co-polymerisation is a (L,L)-lactide with (D,D)-diethylglycolide or of (D,D)-lactide with (L,L)-diethylglycolide co-polymerisation into poly(lactic-co-α-hydroxybutyric acid).
13. A copolymer according to any of the previous embodiments 1 to 12, characterized in that it exhibits a force that is at least 1.5 times higher than co-polymerisation of lactide with a cyclic dimer of another α-hydroxy-acid as co-monomer of the same α-carbon chirality.
14. A copolymer according to any of the previous embodiments 1 to 12, characterized in that it exhibits a force that is at least 2 times higher than co-polymerisation of lactide with a cyclic dimer of another α-hydroxy-acid as co-monomer of the same α-carbon chirality.
15. A copolymer according to any of the previous embodiments 1 to 12, characterized in that it exhibits a force of at least 20 N (as measured at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$).
16. A copolymer according to any of the previous embodiments 1 to 12, characterized in that it exhibits a zero-shear viscosity of at least 15 kPa s (as measured at 185° C., applying a strain amplitude of 1 to 10% and dynamic frequencies ranging from 0.1 to 100 rad $s^{-1}$ and calculated by using a Carreau-Yasuda model fit).

17. A copolymer according to any of the previous embodiments 1 to 12, characterized in that it exhibits a force of 20 to 35 newton (N), preferably 23-25.5 N (as measured at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$).
18. A copolymer according to any of the previous embodiments 1 to 12, characterized in that it exhibits a zero-shear viscosity of 15 to 200 kPa s (as measured at 185° C., applying a strain amplitude of 1 to 10% and dynamic frequencies ranging from 0.1 to 100 rad $s^{-1}$ and calculated by using a Carreau-Yasuda model fit).
19. A copolymer comprises a random co-polymerisation of lactide with a cyclic dimer of another α-hydroxy-acid as co-monomer with opposite α-carbon chirality, characterized in that it has a melt strength (as measured at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$)) of 15 to 40 N, preferably 20 to 35 N, more preferably 23-25.5 N comprising from 90 to 99.6 mol percent of lactic acid and comprising from 10 to 0.4 mol percent of hydroxy-acid co-monomer.
20. A copolymer comprises a random co-polymerisation of lactide with a cyclic dimer of another α-hydroxy-acid as co-monomer with opposite α-carbon chirality, characterized in that it has a melt strength (as measured at 185° C., pushed through a die with a 2 mm diameter at a piston speed of 0.05 mm $s^{-1}$ and spun on a rotating wheel at a pull-off speed of 100 mm $s^{-1}$ and a linear acceleration of 0.12 mm $s^{-1}$)) of at least 15 and preferably at least 20 newton (N) comprising from 90 to 99.6 mol percent of lactic acid and comprising from 10 to 0.4 mol percent of hydroxy-acid co-monomer
21. A poly(lactic-co-α-hydroxybutyric acid) characterised in that the co-polymerisation is at random co-polymerisation of a (L,L)-lactide with (D,D)-diethylglycolide or of (D,D)-lactide with (L,L)-diethylglycolide and further characterized in that it has a melt strength (as measured at 185° C.) of 15 to 40 N, preferably 20 to 35 N, more preferably 23-25.5 N, comprising from 90 to 99.6 mol percent of lactic acid and comprising from 10 to 0.4 mol percent of diethylglycolide.
22. A poly(lactic-co-α-hydroxybutyric acid) characterised in that the co-polymerisation is at random co-polymerisation of a (L,L)-lactide with (D,D)-diethylglycolide or of (D,D)-lactide with (L,L)-diethylglycolide and further characterized in that it has a melt strength (as measured at 185° C.) of at least 15 and preferably at least 20 N comprising from 90 to 99.6 mol percent of lactic acid and comprising from 10 to 0.4 mol percent of diethylglycolide.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given herein below and the accompanying drawings which are given by way of illustration only, and thus are not limitative of the present invention, and wherein.

Figure 1:
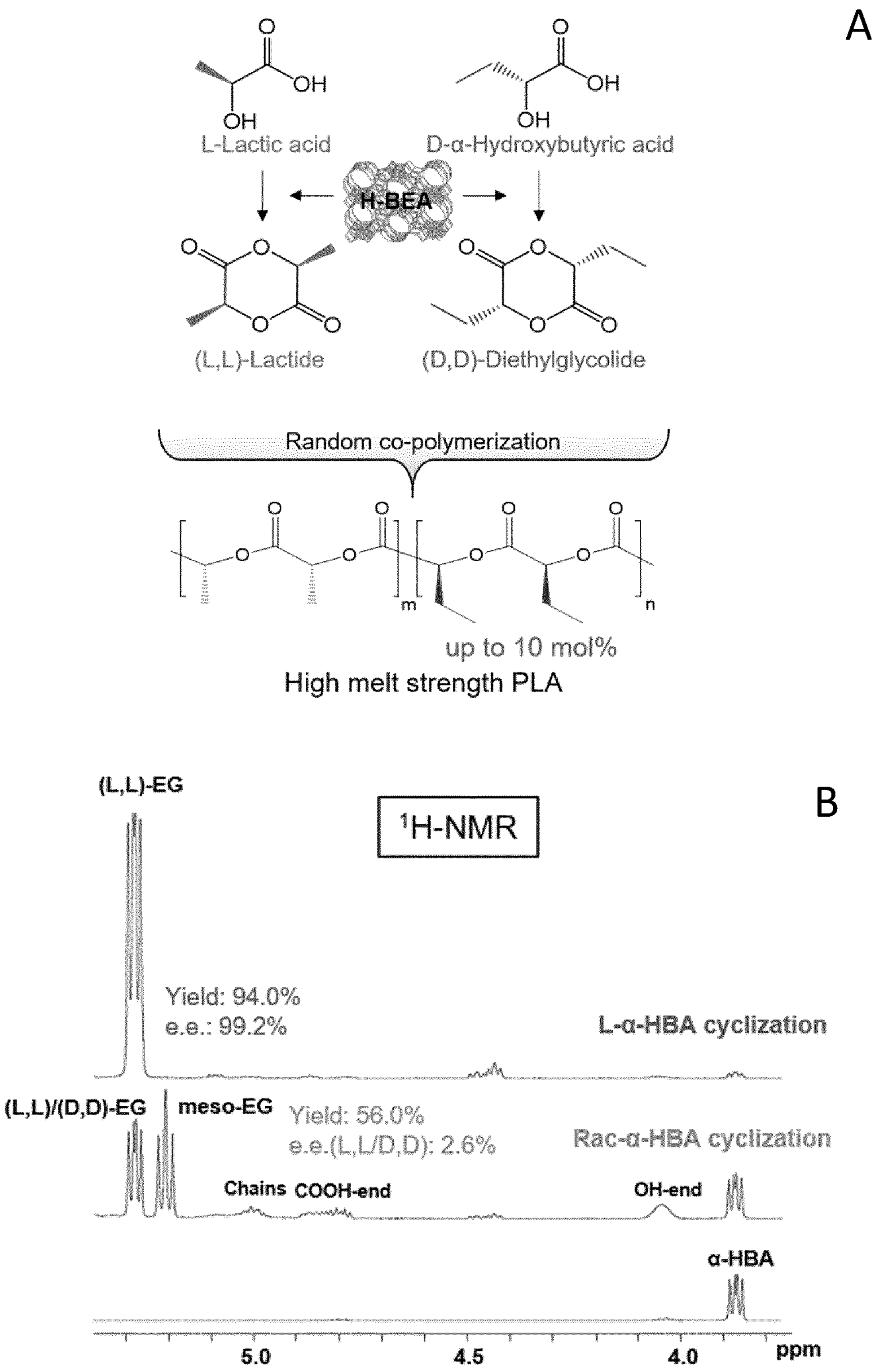
FIG. 1 shows: (A) Catalytic one-step synthesis of diethylglycolide (EG) and random co-polymerisation with lactide (LD) toward high melt strength PLA. (B) $^1$H-NMR (400 MHz, dmso-d6) results from catalytic cyclization of L-α-HBA and rac-α-HBA, resulting in an EG yield of 94.0 (e.e. =99.2%) and 56.0% (e.e. =2.6%) respectively. (C) Chiral GC results from catalytic cyclization of L-α-HBA and rac-α-HBA, showing the absence of racemization and pure (L,L)-EG and a statistical mixture of (L,L), (D,D) and meso-EG, respectively. (D) Monomer conversion (%) of (D,D)-LD [symbol forming upper curve] and 1 mol % of (L,L)-EG [symbols forming lower curve] over 60 minutes of polymerisation (bulk, 170° C., $Sn(Oct)_2$ (monomer:catalyst=489), n-dodecanol (initiator:catalyst=0.7)).
Figure 1:
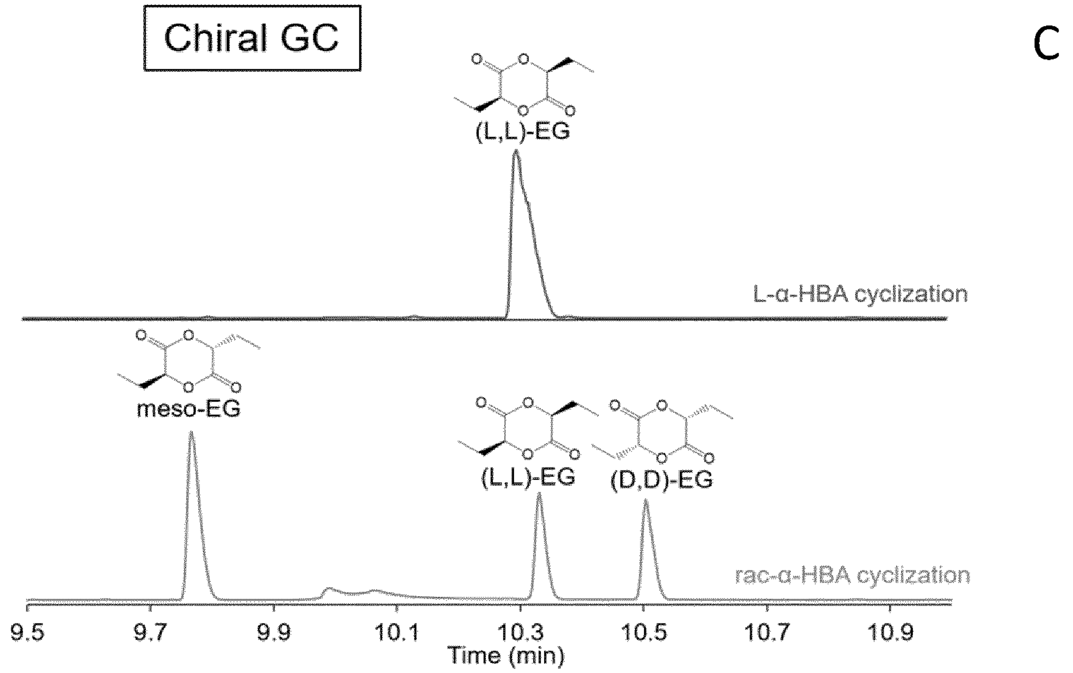
Figure 1:
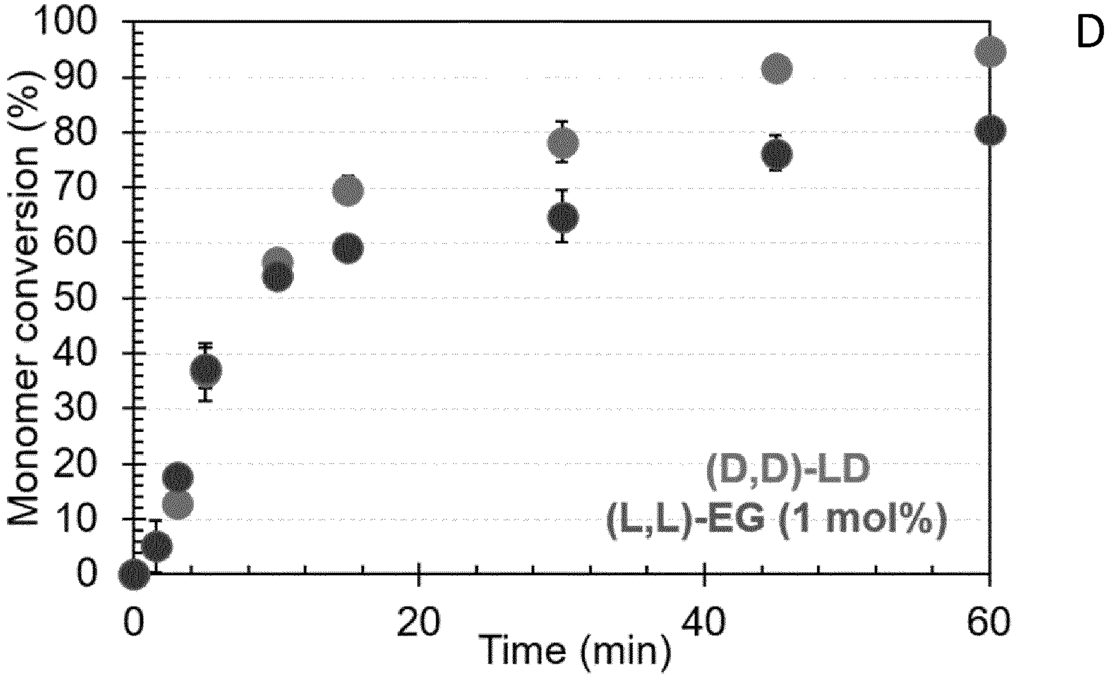

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Biobased and biodegradable polymers are appealing alternatives for petroleum-based plastics, as the latter are associated with environmental pollution, triggering worldwide public concern.

Polylactic acid (PLA), an aliphatic polyester made up of lactic acid (LA) monomers, is nowadays one of the most promising bioplastics on the market [Rafael Auras et al. *Poly(Lactic Acid): Synthesis, Structures, Properties, Processing, and Applications* (John Wiley & Sons, Inc., 2010).

This carbohydrate-based thermoplastic is biodegradable under controlled conditions and exhibits superior mechanical and physical properties, on par with commodity plastics such as polystyrene and poly(ethylene terephthalate) [Garlotta *J. Polym. Environ.* 9, 63-84 (2001)]. Certain factors restrain the adoption of PLA. At present, high-molecular weight PLA is synthesized by ring-opening polymerisation (ROP) of the cyclic dilactone lactide (LD), which is made by a back-biting depolymerisation of polycondensed LA [Rafael Auras et al. *Poly*(*Lactic Acid*): *Synthesis, Structures, Properties, Processing, and Applications* (John Wiley & Sons, Inc., 2010)]. While dilactones and ROP are indispensable, making LD is a two-step time- and energy consuming process that requires additional purification, driving up the cost of production. Moreover, LD yields are mediocre and the process is confronted with racemization, losing some control over the enantiopurity of (L,L)-lactide (L-LD), and thus PLA [Gruber, et al., Continuous process for manufacture of lactide polymers with controlled optical purity (1992)].

Recently, a zeolite-based catalytic process was developed in our lab, enabling the single-step conversion of LA to LD. The highly selective route outperforms the two-step procedure, potentially in cost and certainly in atom efficiency (few side-products) and in preserving the stereochemistry (no racemization) [Dusselier et al. *Science* 349, 79-81 (2015)].

A more intrinsic PLA drawback is associated with its processing performance and consequently its applicability. PLA has a poor melt strength, melt viscosity and melt elasticity, all crucial properties for elongational flow dominated processes such as film blowing, blow moulding, fibre spinning, foaming, etc. [Lim et al. Prog. Polym. Sci. 33, 820-852 (2008); Dorgan, in *Poly*(*Lactic Acid*): *Synthesis, Structure, Properties, Processing and Applications*, Rafael Auras et al. Ed. (John Wiley & Sons, 2010), pp. 125-139].

Different strategies for improving the melt strength properties of PLA have been described. Some effort focuses on the use of chain extenders to create long chain, branched, cross-linked or star-shaped structures of PLA, to enhance chain entanglements [Dorgan et al. *J. Rheol.* (N. Y. N. Y). 43, 1141-1155 (1999); Michalski et al. Prog. Polym. Sci. 89, 159-212 (2019); Corre et al. *Rheol. Acta* 50, 613-629 (2011)]. Although chain extenders can boost numerous properties of PLA, final polymer structures are often difficult to control, while seeking the optimal extender concentration remains challenging. In addition, chain extended polymer structures can exhibit a reduced degradability [Iñiguez-Franco et al. *Polym. Test.* 67, 190-196 (2018); Limsukon et al. *Polym. Test.* 80, 106108 (2019)], whereas extending agents themselves are often not biodegradable or biocompatible and in some cases even toxic (diisocyanates).

A second strategy consists of blending PLA with other polymers, as well as compounding it with different micro- or nanosized fillers (e.g. 5 wt %) to enhance its melt behaviour [Nofar et al. *Polym. Rev.* 59, 465-509 (2019)]. However, homogeneous blends or equal particles dispersion are not readily to obtain. Moreover, blending can result in recycling or (bio)degradation limitations.

Finally, stereocomplex crystallites, induced by mixing PLAs of opposite chiral nature (L-PLA with 5 wt % D-PLA), can act as crosslinking points, resulting in a melt behaviour similar to chain-extended PLA structures [Yamane et al. *J. Rheol.* (N. Y. N. Y). 48, 599-609 (2004)]. This would require large scale availability of pure D-LA, which is not trivial.

In contrast to these strategies, studies linking the composition of the backbone (linear lactide-based co-polymers) to rheological properties are scarce, despite the obvious value in microstructure—viscoelasticity relations for these polyesters. One group performed a few rheological studies on syndio- and heterotactically enriched PLAs [Chile et al. *Macromolecules* 49, 909-919 (2016)]. The effect of incorporating D-LD in L-PLA has been a topic of investigation but without unambiguously clarifying the impact of the D/L ratio or showing a negligible change in polymer melt viscosity [Dorgan et al. *J. Rheol.* (N. Y. N. Y). 49, 607-619 (2005); Othman et al. *J. Rheol.* (N. Y. N. Y). 55, 987-1005 (2011)].

Present invention concerns an unexpected and significant improvement of melt strength behaviour of PLA by ring-opening co-polymerisation of LD with (small amounts of) diethylglycolide (EG) of opposite chiral nature (FIG. 1A).

Racemic diethylglycolide (mixture of D,D+L,L) has been polymerised before, its traditional synthesis is homogeneously catalysed, inefficient and laborious, ending up with a mixture of diastereomers [Yin & Baker Macromolecules 32, 7711-7718 (1999); Trimaille et al. *J. Polym. Sci. Part A Polym. Chem.* 42, 4379-4391 (2004)]. Enantiomerically pure homo- and co-polymers so far have only been made by polycondensation of α-HBA or a combination of α-HBA and LA, a method leading to low molecular weight compounds (e.g. 10000 g/mol) and different polydispersities, effectively constituting different materials and corresponding different material properties [Tsuji et al. Biomacromolecules 11, 252-258 (2010); Tsuji et al. *Polymer* (*Guildf*). 52, 1318-1325 (2011); Tsuji & Sobue *Polymer* (*Guildf*). 72, 202-211 (2015)]. Zeolite-based cyclization of α-hydroxy acids here not only provides for efficiency and high yields, it maintains the stereochemistry of the substrate. Enantiomerically pure cyclic ester monomers give access to a wide range of unexplored high-molecular weight (co)-polymers with possibly attractive new properties. Rheological studies on co-polymers of enantiomerically pure LD and EG revealed a strong increase in zero shear viscosity, elastic modulus and elongational viscosity compared to conventional PLA, with clearly observed differences associated with the chiral nature of the monomers. While improvements in melt properties are usually obtained through chain extension, blending or compounding, a simple co-polymerisation here suffices, even for small EG incorporations. Unexpectedly, a strategy with promise for large scale implementation thus arises, given the ease of dropping in 1% of D-EG (=(D,D)-diethylglycolide) into the lactide batch for classic L-PLA production. The gains in melt strength could translate to fewer weight of plastic needed per functional item (e.g. blow moulding a thinner bottle) and expand the application horizon for PLA.

Referring now specifically to the drawings, an improvement of melt strength behaviour of PLA by ring-opening co-polymerisation of LD with small amounts of diethylglycolide (EG) of opposite chiral nature according to an embodiment of the present invention is illustrated in FIG. 1A (showing the monomer synthesis and co-polymerisation) and shown.

EXAMPLES

Example 1 Catalytic Monomer Synthesis and Co-Polymerisation

The one-step catalytic conversion of lactic acid (LA) to lactide (LD) in the presence of Brønsted acidic zeolite Beta (H-BEA), as shown in (ref 4) and corresponding patents, is applied towards the cyclization of α-hydroxybutyric acid (α-HBA) to form diethylglycolide (EG).

Applying the same reaction conditions to L-α-HBA as applied to L-LA by Dusselier et al cited above (130° C., 3 h, toluene, H-BEA ($SiO_2/Al_2O_3$=25)) only yielded 5% L-EG, compared to 78% for L-LD. This could be overcome by increasing the reaction temperature to 170° C. (xylene, yield=76%). Reactions in absence of a catalyst revealed—next to the expected low cyclic ester selectivity—a conversion decline with increasing steric hindrance of the alkyl chains at the α-position. In this regard, one could expect that α-HBA would tend to form smaller products and perhaps favour ring-closure. Nonetheless, a reaction with a soluble acid catalyst (sulphuric acid) at full monomer conversion yielded less than 5% of EG, indicating the need for confining the acid function in a shape-selective catalyst such as H-BEA. Optimized, the zeolite reaction (with H-BEA, $SiO_2/Al_2O_3$=150), proceeded even faster and more selective towards (L,L)-diethylglycolide (L-EG) (yield=88%). Distillation of α-HBA before reaction further enhanced the L-EG yield to 94% in a single step. $^1$H-NMR showed an excellent enantiomeric purity of 99.6% L-EG (e.e. =99.2%) with formation of only 0.4% meso-EG ((L,D)-EG). In contrast to enantiopure α-HBA, racemic α-HBA (rac-α-HBA) conversion is slower and less selective (yield=56%) for cyclic esters, but still a statistical mixture of the L,L; D,D- and L,D-diastereomers is achieved confirming the absence of racemization in the direct zeolite-catalysed route (FIG. 1 (B) and (C)). After reaction, the heterogeneous catalyst is easily removed and cyclic esters are separated from the linear oligomers and unreacted monomer by phase extraction. Subsequent crystallization leads to an overall EG purity of 99.5% (e.e. 100%) and an overall isolated yield of 48%. Obtaining higher isolated yields should be possible, but this was not the scope here, where purity for ROP was the main concern.

Ring-opening polymerisation, based on Kaihara et al. *Nat. Protoc.* 2, 2767-2771 (2007), was performed with a stannous octanoate $Sn(Oct)_2$ catalyst and 1-dodecanol initiator. This catalytic system ensures preservation of the stereochemistry of the monomers within the polymer chains, high molecular weight and low polydispersity. Diverse lactide-based polyesters were synthesized with different incorporations of EG, varying between 0.3 and 10 mol % (n/(m+n) in FIG. 1 (A)). The polymers vary in stereochemistry of the co-monomers (L-EG or D-EG with L-LD or D-LD). $^1$H-NMR proved the successful incorporation of the co-monomers in polylactide and weight-average molecular weights ($M_{wS}$) varied between 101 and 149 kg/mol (Table 1). While ring opening polymerisation is applied and high molecular weights are deemed necessary, it is not excluded that polycondensation routes from α-hydroxy acids of opposite chirality to obtain very similar co-polymers of sufficient molecular weight could also work.

Various benchmarks were synthesized, i.e. a co-polymer of L-LD with 10 mol % D-LD and pure P(L-LD) and P(D-LD), or purchased. The latter, a commercial PLA (Ingeo 7001D, NatureWorks) has specifications targeting use in injection stretch blow moulded bottle applications.

Chain structures of co-polymers are dependent on the relative polymerisation rates of the different monomers. If propagation rates are comparable, random chain structures are obtained, whereas a significant rate difference leads to block co-polymers. There is a decrease in polymerisation rate of alkyl-substituted lactides with increasing steric hindrance of the substituents [Trimaille et al. *J. Polym. Sci. Part A Polym. Chem.* 42, 4379-4391 (2004); Saiyasombat et al. *Polymer* (*Guildf*). 39, 5581-5585 (1998); Vogel et al. *Proceedings of the American Chemical Society*, (2007), p. 2; Jing et al. *Macromolecules* 40, 9304-9312 (2007)]. Nevertheless, the difference in polymerisation rate between rac-LD and rac-EG has been described as rather small, indicating a high degree of randomness within their co-polymer chains [Vogel et al. *Proceedings of the American Chemical Society*, (2007), p. 2; Yin & Baker Macromolecules 32, 7711-7718 (1999)]

Here, the randomness of incorporation was explored and quasi confirmed by determining the time evolution of the co-monomers during ROP (FIG. 1 (D)). Only insubstantial differences in the relative progression of the conversions are detected. L-EG polymerisation progresses (relative to its starting amount of 1%) only slightly slower than D-LD (99%), most probably giving rise to strongly randomized co-polymers.

Synthesis of Diethylglycolide

In a typical reaction, 0.01 mol of (L)- or (D)-α-hydroxybutyric acid and 0.5 g of H-Beta zeolite are added to a round bottom flask with 20 mL of toluene or o-xylene. On top of the round bottom flask, a custom made Dean-Stark trap, filled with solvent, is installed. The setup is connected to a condenser, and heated in an oil bath at 130 or 170° C. The mixture is stirred for 3 hours. After reaction, the mixture is homogenized by addition of 15 mL of acetonitrile. After homogenization, the zeolite is removed by filtration over a glass frit filter under vacuum. After the first filtration, the catalyst is rinsed with another 10 mL of acetonitrile.

Ring-Opening Polymerisation

Solvent-free ring-opening polymerisations (ROP) is carried out in a dry, custom-made round-bottom flasks. In a typical experiment, a desired amount of monomer is added to the flask in an oxygen- and moisture free environment. A solution of stannous octoate in toluene as catalyst (monomer:catalyst=2500:1) and 1-dodecanol as initiator (70 mol % of the catalyst) are added to the monomer. The solvent is removed in vacuo and the flask is filled with argon and immersed in an oil bath at 170° C. for 70 minutes. After polymerisation, the flask is cooled, and the polymer is dissolved in chloroform. The synthesized polymers are separated from the remaining monomers and oligomers via precipitation in methanol, filtered, and dried under reduced pressure.

Example 2 Melt Rheology

Shear Rheology

Melt rheological properties of polymers govern their flow behaviour during processing towards various applications. Processing of PLA remains challenging due to its low melt strength and low melt viscosity and melt elasticity, limiting its applicability. Melt strength, can be indirectly determined by measuring the zero shear viscosity ($\eta_0$) through strain controlled small amplitude oscillatory shear (SAOS) rheometry. Measurements were performed on the co-polymers described in Fout! Verwijzingsbron niet gevonden. at 185° C. and at a constant strain of 1% under nitrogen, to determine the modulus of complex viscosity ($|\eta^*|$) and the elastic (G') and viscous (G") moduli with changing angular frequencies (co) between 0.1 and 100 rad·s$^{-1}$. $\eta_0$, being the plateau value of the complex viscosity at infinitely small ω, is determined by application of the Carreau-Yasuda model. The results of the co-polymers containing 9-10% co-monomers are depicted in FIG. 2 (A-C), while the same data for co-polymers with 0.6-0.7 mol % EG can be consulted in FIG. 2 (D-F).

Figure 2:
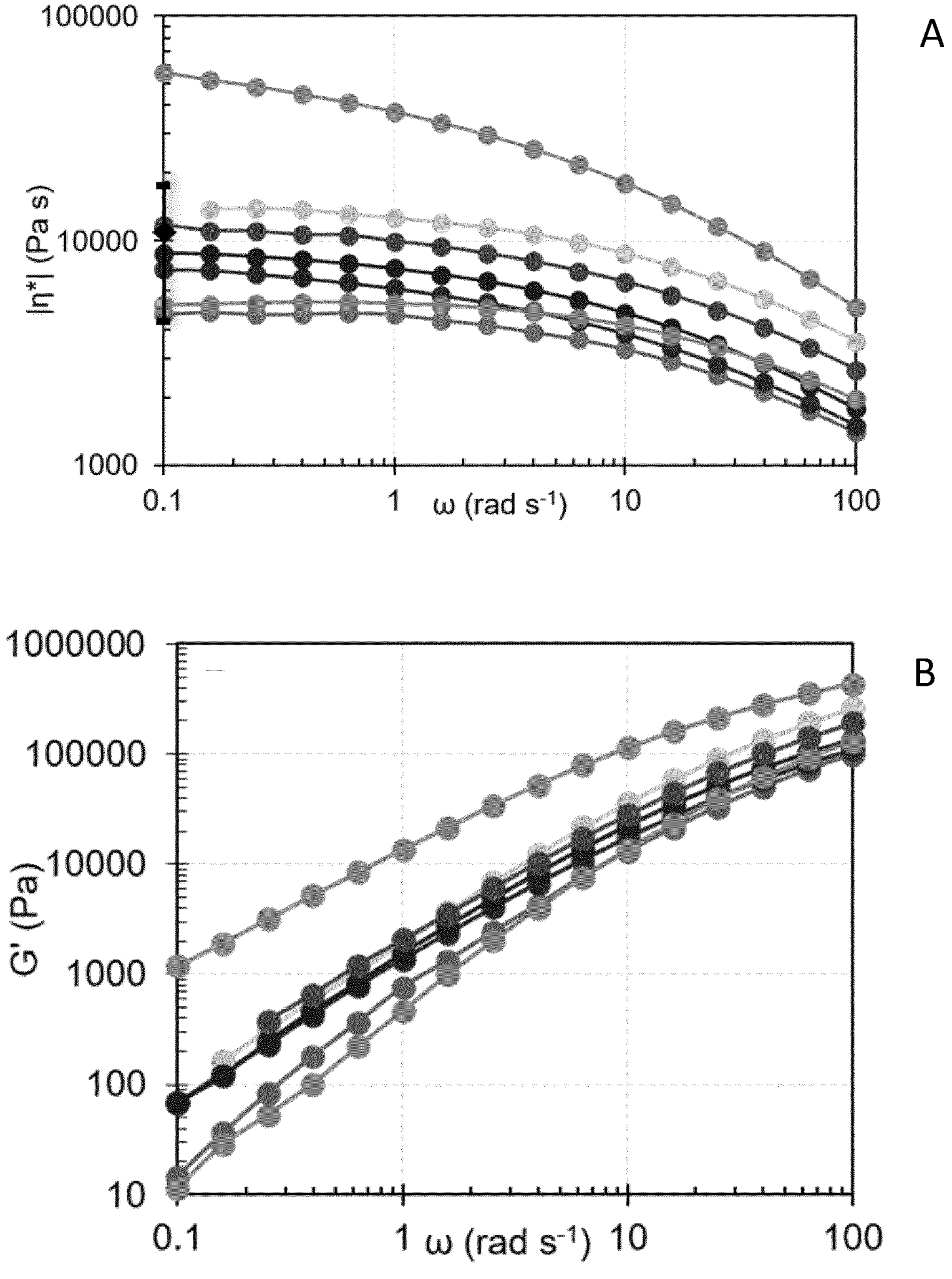
FIG. 2 shows: (A) complex shear viscosity (|η*|), (B) elastic modulus (G') and (C) viscous modulus (G") as a function of angular frequency (w) for co-polymers with 9-10 mol % of co-monomer. (D) complex shear viscosity (|η*|), (E) elastic modulus (G') and (F) viscous modulus (G") as a function of angular frequency (ω) for co-polymers with 0.6-0.7 mol % of co-monomer. ◇ and error bars at 0.1 rad·$s^{-1}$ in (A) and (D) indicate the average value and standard deviation of all different synthesized P(L-LD)s and P(D-LD)s combined.
Figure 2:
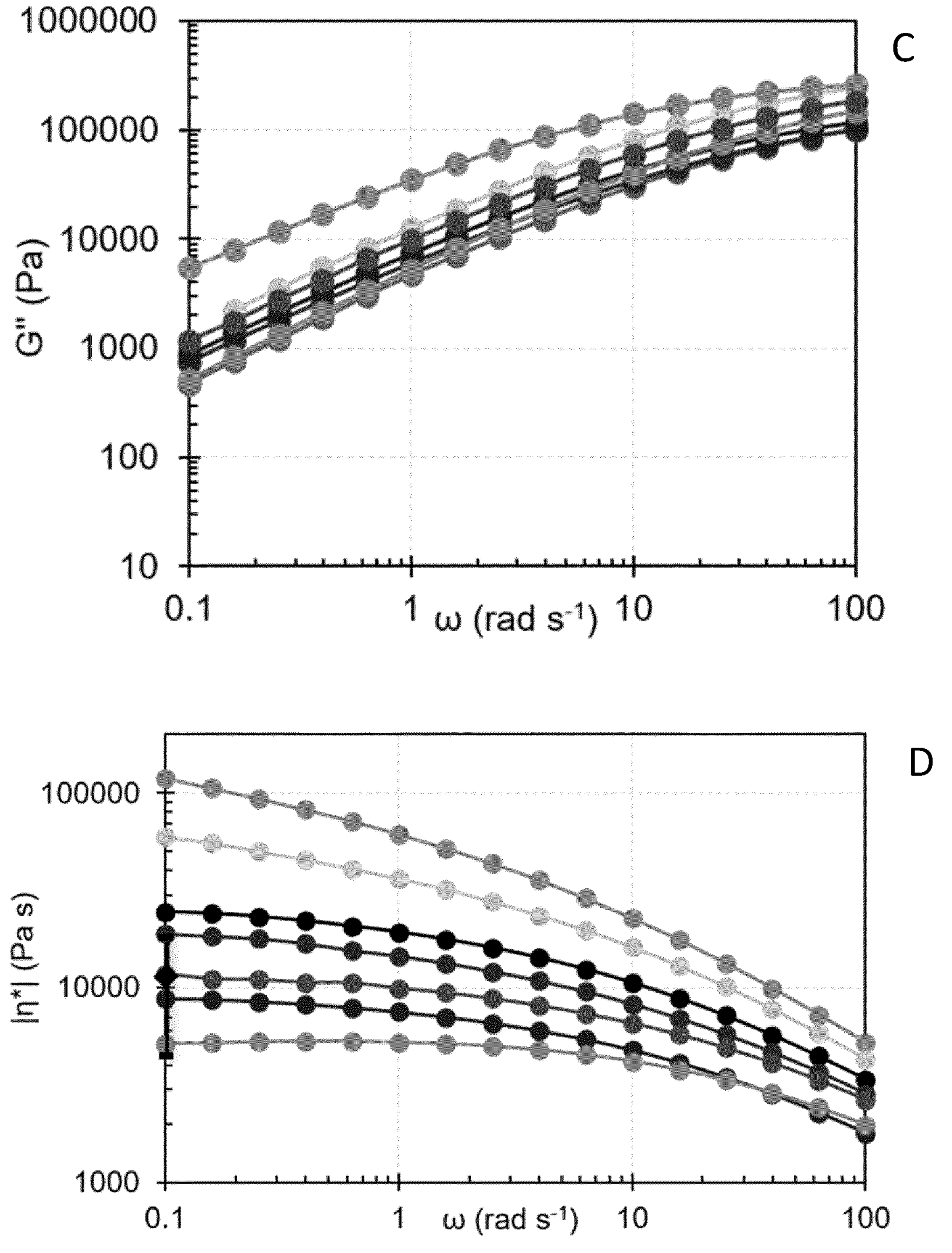
Figure 2:
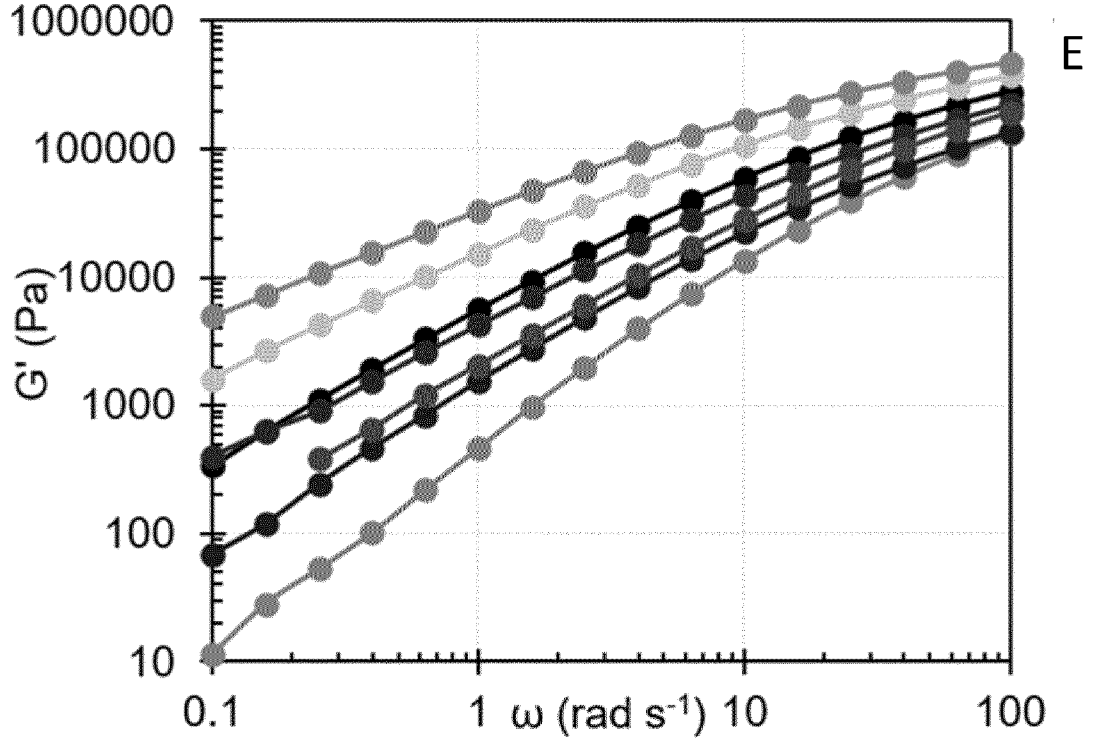
Figure 2:
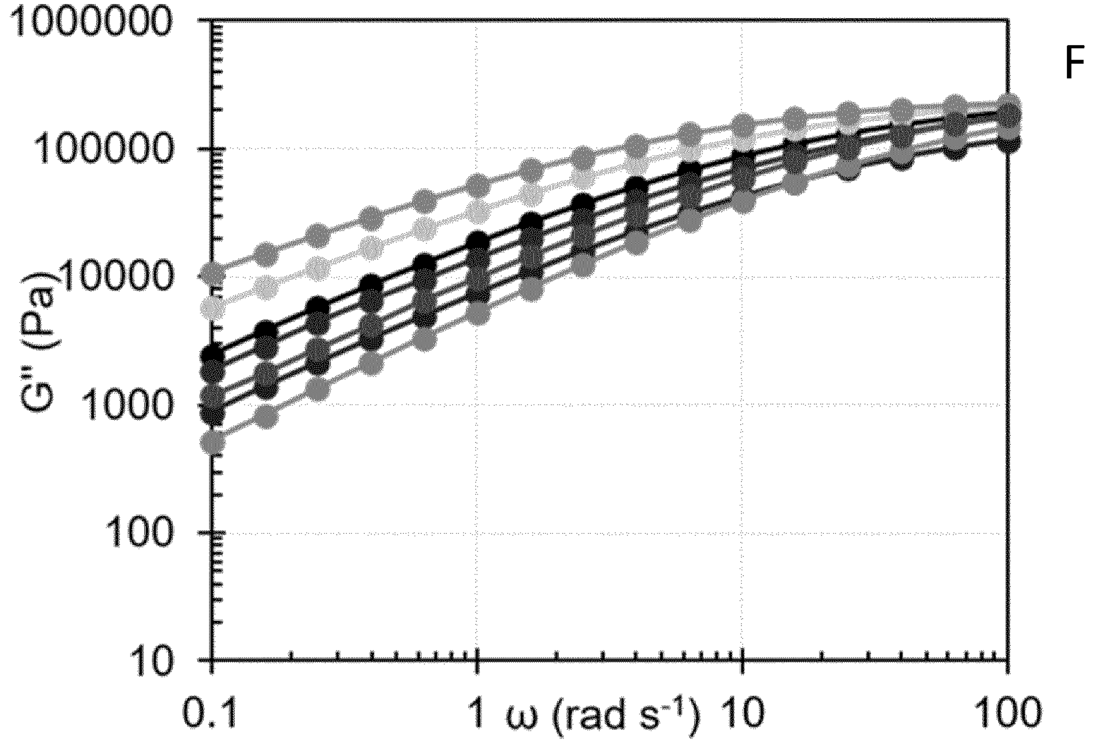
Figure 3:
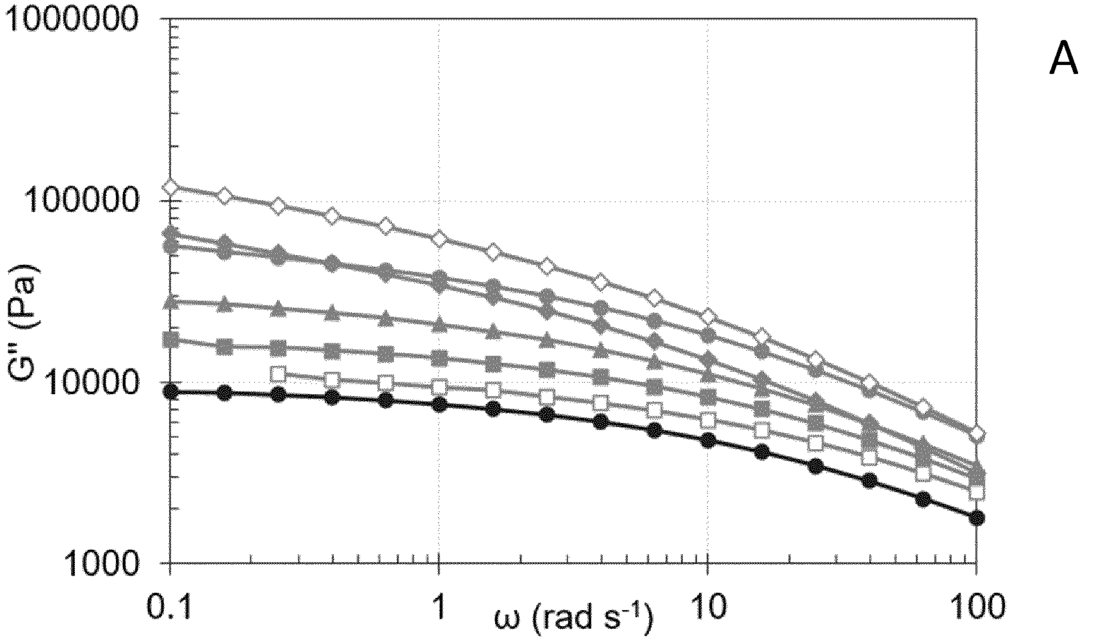
FIG. 3 shows: (A) complex shear viscosity (|η*|), (B) elastic modulus (G') and (C) viscous modulus (G") as a function of angular frequency (ω) for co-polymers of D-LD with different mol % of L-EG. (D) complex shear viscosity (|η*|), (E) elastic modulus (G') and (F) viscous modulus (G") as a function of angular frequency (ω) for co-polymers of L-LD with different mol % of D-EG.
Figure 3:
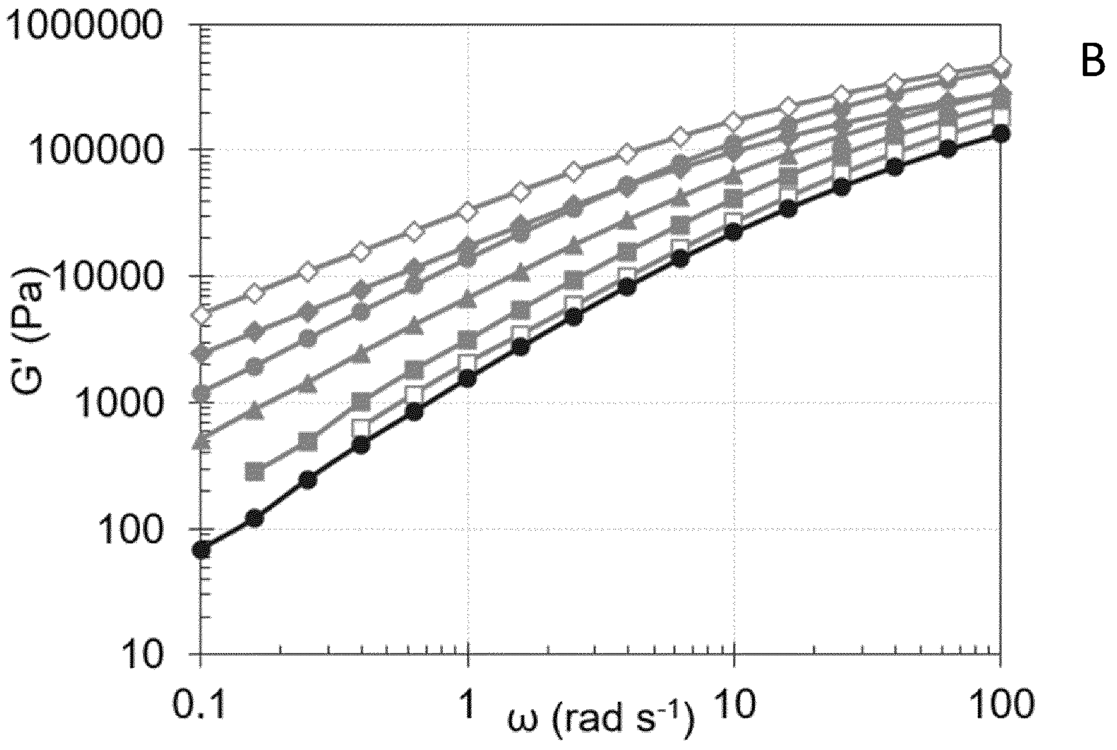
Figure 3:
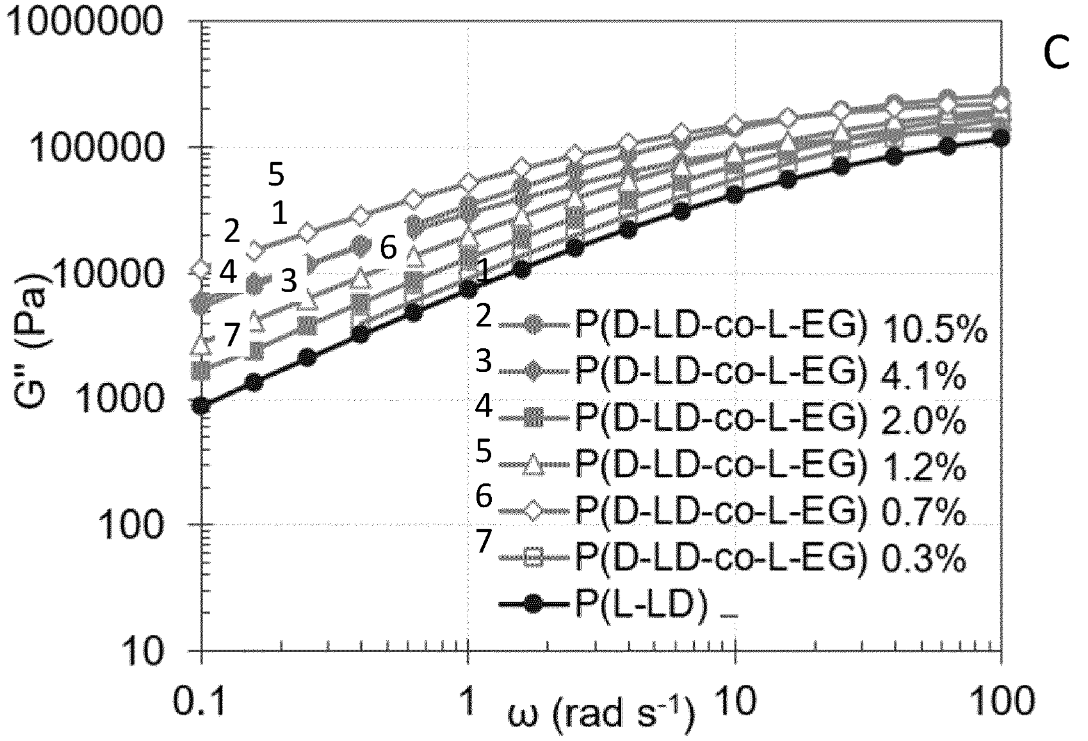
Figure 3:
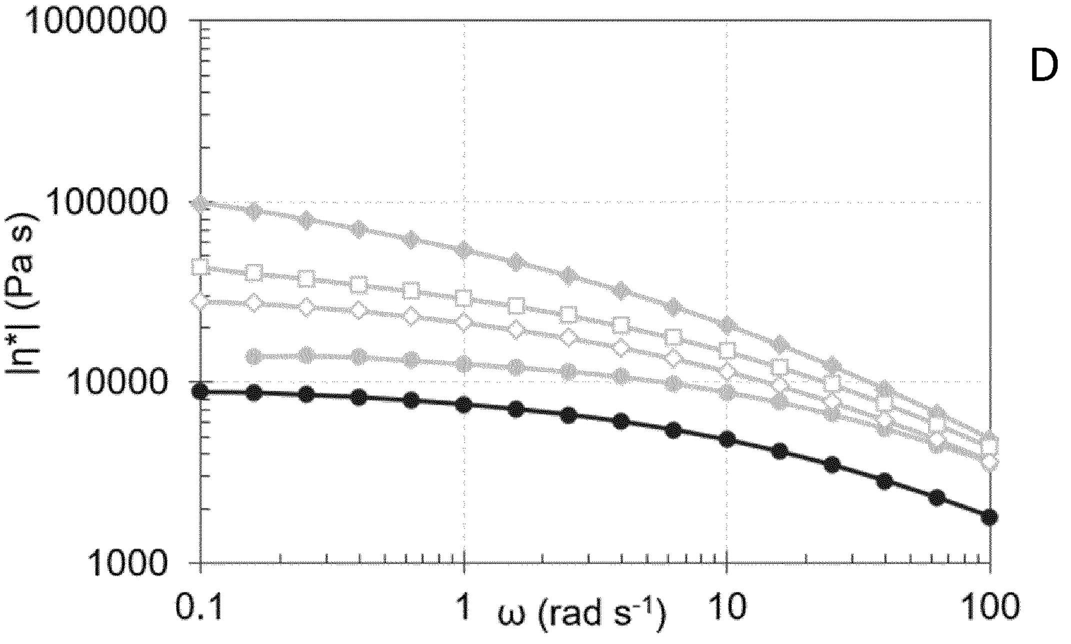
Figure 3:
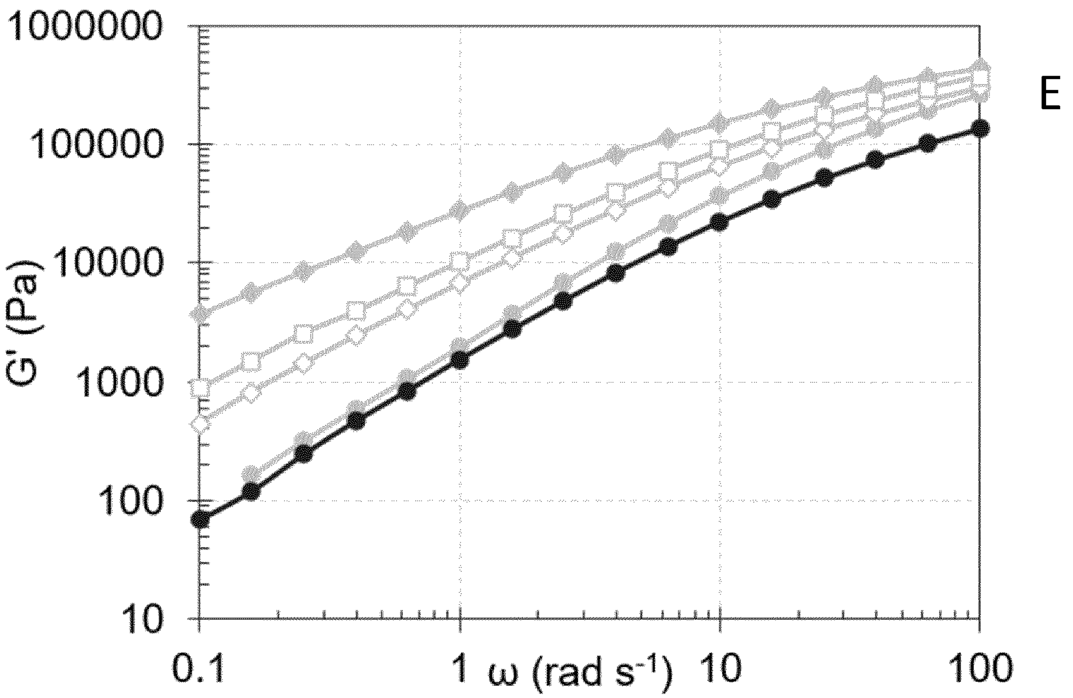
Figure 3:
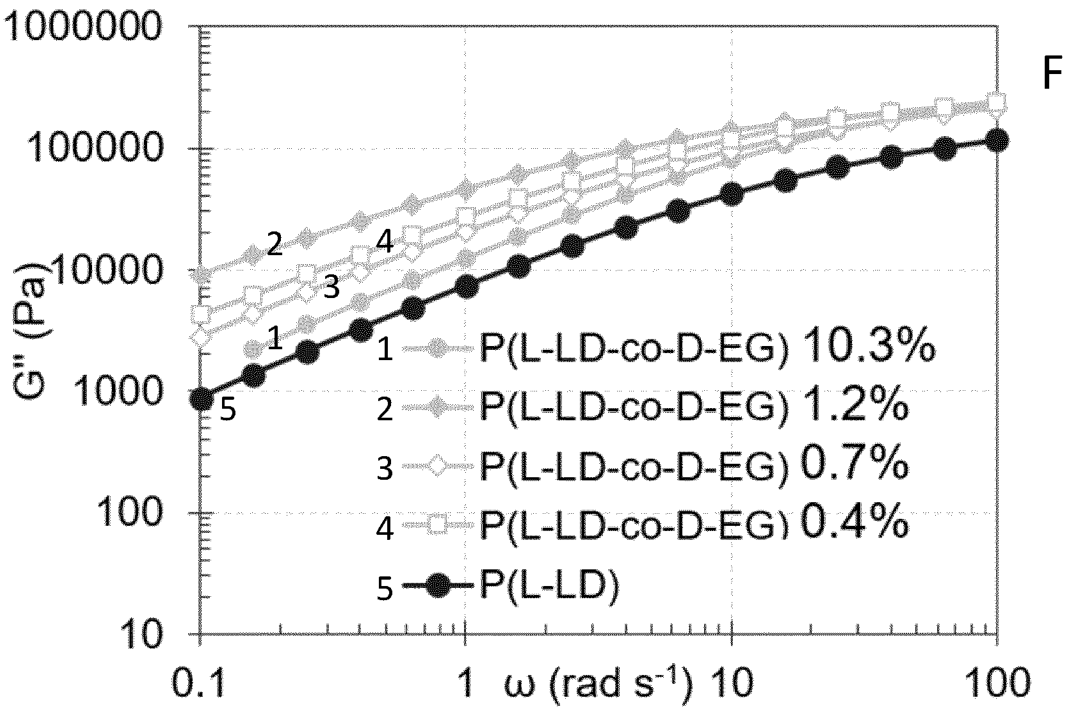

All polymer melts tend to a Newtonian plateau at low frequencies, while shear-thinning occurs at higher frequencies (FIG. 2(A) and (D)). Comparing the viscoelastic properties of the co-polymers with P(L-LD), a self-made control with similar $M_w$, and the commercial grade PLA (Ingeo) designed for injection stretch blow moulding, several observations can be made. Adding 10 mol % of D-LD to P(L-LD) seems to decrease the viscosity and elasticity of pure P(L-LD) to a small extent, in line with earlier studies noting only subtle differences in the viscoelastic properties of polylactides with various D-LD contents [Dorgan et al. *J. Rheol.* (N. Y. N. Y). 49, 607-619 (2005); Othman et al. *J. Rheol.* (N. Y. N. Y). 55, 987-1005 (2011); Palade et al. *Macromolecules* 34, 1384-1390 (2001)]. While the viscoelastic properties do not seem to change a lot with incorporation of 10 mol % L-EG in P(L-LD), co-polymers of 10 mol % EG and LD with opposite stereochemistry exhibit a remarkable increase in both complex viscosity and elasticity of the polymer melts (FIG. 2 (A-C)). While the shear viscosities ($\eta_0$) of P(L-LD) and P(D-LD) are determined to be 9.7 and 12.1 kPa s, the values of P(L-LD-co-D-EG) and P(D-LD-co-L-EG) are estimated at 15.2 and 71.8 kPa s, respectively (Carreau-Yasuda model). Since the no is strongly dependent on chain length [Cooper-white & Mackay *J. Polym. Sci. Part B Polym. Phys.* 37, 1803-1814 (1999); Fox & Loshaek *J. Appl. Phys.* 26, 28-31 (1955)] one could argue that the viscosity increase in P(L-LD-co-D-EG) is limited due its rather low $M_w$ (101 kg/mol). Nevertheless, P(D-LD-co-L-EG) exceeds the viscosity of P(L-LD) with a factor 6.5, exhibiting a unique positive impact on the viscoelastic properties of polylactide. Comparable results were obtained when much lower amounts of 0.6-0.7 mol % EG where incorporated in polylactide (FIG. 1 (D-F)). Co-polymers in which EG and LD had the same stereochemistry (P(L-LD-co-L-EG and P(D-LD-co-D-EG)) exhibited a limited increase in viscosity and elasticity, while a more significant increase was observed for co-polymers of L-LD and D-EG or D-LD and L-EG. To study the effect of the co-monomer ratio (EG:LD) on the viscoelastic properties of the materials, various co-polymers (P(L-LD-co-D-EG) and P(D-LD-co-L-EG)) with different percentages of EG were analysed (Table 1 and FIG. 3). It can be noticed that for both P(L-LD-co-D-EG) and P(D-LD-co-L-EG) no clear correlation exists between viscosity or elasticity and the co-monomer ratio, apart from the effect versus L or D-PLA always begin clearly present for incorporations higher than 0.3 mol %. For P(D-LD-co-L-EG) rather low $\eta_0$s and high $\eta_c$S are observed when 0.3 or 2.0 mol % of EG is incorporated, while incorporation of 0.7, 4.1 or 10.5% exhibits a remarkable improvement in viscoelastic properties. For P(L-LD-co-D-EG) very high viscosity and elasticity is seen when 1.2 or 0.4% of D-EG is used. Nevertheless, the co-polymer with 10.3 mol % D-EG shows a much smaller increase, which is likely attributed to its rather low $M_w$ compared to the other polymers. Although $M_w$s vary to some extent, the variation is limited and unlikely to cause such large effects. In addition, these effects seem to be reproducible in different co-polymers of LD and EG.

Extensional Rheology

Although shear rheometry and zero shear viscosity give good indications about the melt properties of the co-polymers, extensional rheometry can be used as a direct measurement of melt strength. To confirm the existence of the unusually high zero shear viscosities, to mitigate some of the variability of small scale experiments, and to allow extensional rheometry (sample sizes), the bulk ROP reactions were scaled-up to 100 g. A pure P(L-LD) polymer and a co-polymer of L-LD with 1.2% of D-EG were synthesized and compared to the commercial grade PLA used for injection stretch blow moulding applications (e.g. bottles).

Figure 4:
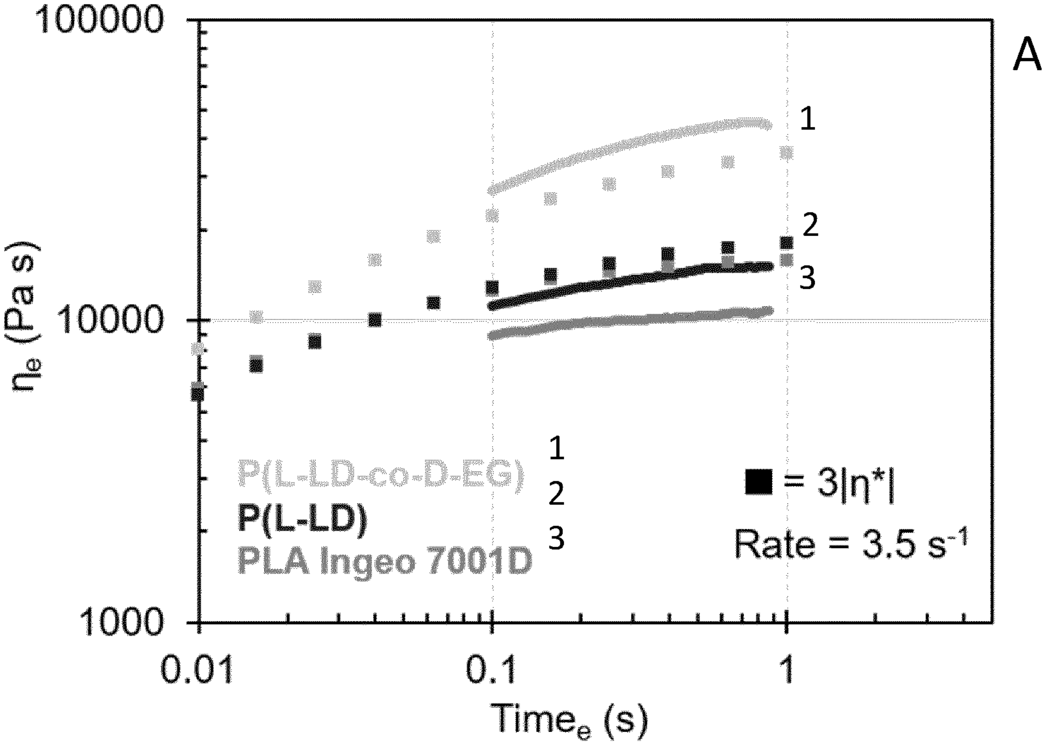
FIG. 4 shows: Large scale extensional viscosity measurements on P(L-LD), P(L-LD-co-D-EG) (1.2 mol % D-EG) and PLA Ingeo 7001D (A) Extensional viscosity (ne) as a function of extension time ($time_e$) at a Hencky strain rate of 3.5 $s^{-1}$ determined with an extensional viscosity fixture rheometer (full line). ■ represents the complex shear viscosity (|η*|) data determined by SAOS multiplied by a factor 3 according to the Trouton ratio. (B) Average extensional force exerted by the polymer materials determined by a Haul-off extensional rheometer.
Figure 4:
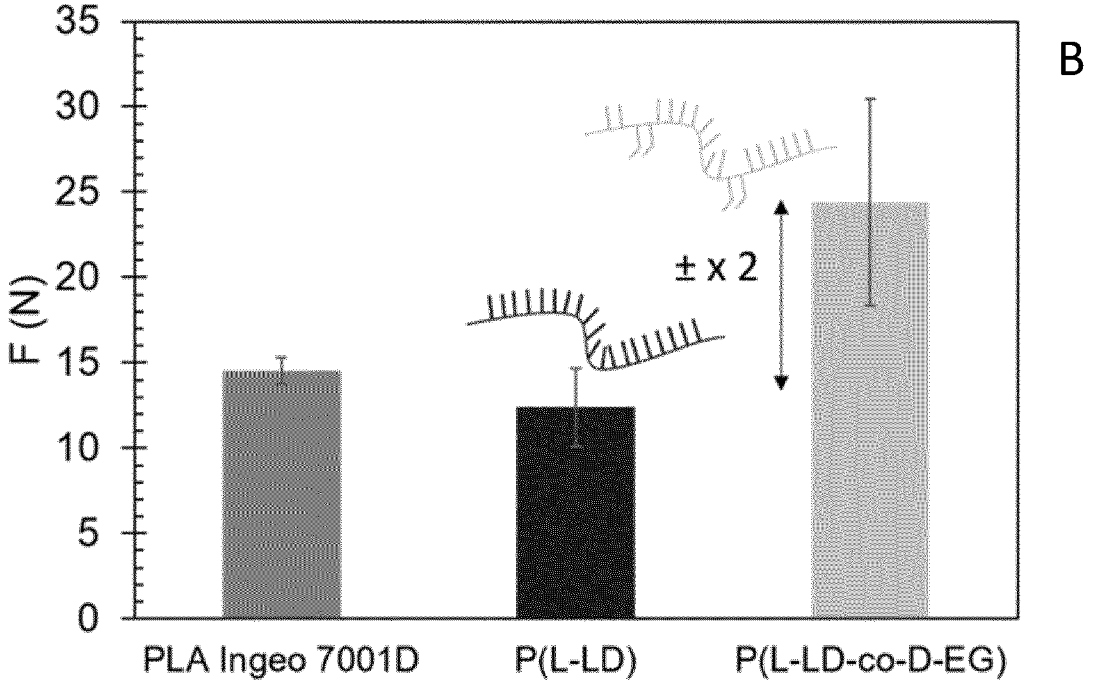

Extensional viscosity fixture measurements were performed at different Hencky strain rates (0.1, 0.5, 1 and 3.5 $s^{-1}$) to determine the extensional viscosity ($\eta_e$) as a function of extension time (time$_e$) (FIG. 4 (A)). Extensional viscosity is related to no by a factor three as explained by the Trouton ratio ($\eta_e = 3\eta_0$). A comparable extensional viscosity is observed for the commercial PLA grade and the synthesized P(L-LD) sample, while P(L-LD-co-D-EG) confirms its higher viscosity. Although a strong difference in viscosity is noticed, no strain hardening behaviour is seen at these Hencky strain rates, in agreement with literature on extensional viscosity of linear polylactide [Hedegaard et al. *J. Rheol.* (N. Y. N. Y). 59, 1397-1417 (2015); Gu et al. *J. Rheol.* (N. Y. N. Y). 61, 785-796 (2017)]. Finally, to directly measure the melt strength, vertical polymer melt strands were spun on a wheel at a linearly accelerating velocity (100-5000 mm/s) and the extensional force exerted by the materials was determined using a Haul-off extensional rheometer. P(L-LD-co-D-EG) exhibited an average force of about 24.4 N (FIG. 4B), which is about two times higher than the force of P(L-LD) (12.4 N). P(L-LD) and the commercial PLA showed comparable values.

Technical effects of the invention have been displayed in Table 1. And the figures in particular FIGS. 2-4.

Differences in the thermal properties of the various co-polymers are observed. In general, a downward trend in glass transition temperature ($T_g$), melt temperature ($T_m$) and degree of crystallinity ($X_c$) are obtained with increasing amount of EG co-monomer (Table 1). $T_m$ and $X_c$ show a stronger decrease if co-monomers with opposite stereochemistry are used.

Co-polymerisation of LD and EG with a reverse stereoconfiguration seems to have a unique positive impact on the viscoelastic properties of PLA. While improvements in melt properties are mostly the result of chain extension, stereocomplexation, blending, compounding, etc., obtaining these effects through co-polymerisation is unexpected and may be very promising. A higher melt strength could facilitate certain elongational dominated processes (extrusion blow moulding, thermoforming, film blowing, foaming, etc.), broadening the application window of PLA bioplastics only by adding a small amount of co-monomer to the existing ROP procedure. Moreover, if a thinner stretch can be achieved without breakage of the stronger melt, less polymer can be used for a given application, leading to a smaller ecological footprint of the plastic application.

Small Amplitude Oscillatory Shear

Small amplitude oscillatory shear (SAOS) measurements are carried out on an AresMelts rheometer, using a parallel plate set-up (8 mm diameter) surrounded by a convection oven, purged with $N_2$ gas. Prior to rheology measurements, polymer samples are compression moulded into discs of 8 mm diameter and a thickness of 1 mm. The polymer discs are vacuum dried overnight at 80° C. prior to SAOS measurements. First, dynamic time sweep measurements are performed to verify the thermal stability of the polymer samples under the applied test method. The changes in G' and G" are determined in time at an angular frequency of 10 rad/s, a strain amplitude of 1% and a temperature of 185° C.

during 300 s. Secondly, strain sweep tests are performed by varying the strain amplitude between 0.1 and 10% to determine the linear viscoelastic regime of the materials. Frequency sweep measurements are carried out at 185° C. with dynamic frequencies ranging from 0.1 to 100 rad/s at a strain amplitude of 1-10%. Consecutively rate sweep tests are performed applying shear rates between 0.01 and 1 $s^{-1}$. At each shear rate a waiting time of 30 s is installed to guarantee steady state, while a measuring time of 10 s is applied.

Extensional Viscosity Fixture

Extensional flow properties of the polymers are determined on an AresMelts rheometer, using an Extensional Viscosity Fixture (EVF) set-up. Extensional viscosities are measured in strain-controlled stretch experiments with a Hencky strain of 3.4 at 185° C. under a $N_2$ atmosphere. The polymer samples are compression molded into rectangular plates of 18.0 mm long, 10.0 mm (±0.10 mm) wide and 0.80 (±0.05 mm) thick. Prior to stretch measurements the plates are dried at 80° C. overnight. The experimental protocol consists of three steps. During the first step a pre-stretch with a stretch rate of 0.0075 $s^{-1}$ is performed on the polymers to compensate for thermal expansion during heating. Before pre-stretch a delay time of 50.0 s is applied to ensure the polymer samples are completely molten. The pre-stretch is followed by a relaxation step of 5.0 s to remove residual stress in the sample. Finally, the stretch measurement takes place at a constant Hencky strain rate (0.05, 0.1, 0.5, 1, 3.5 $s^{-1}$).

Haul-Off

To determine the extensional properties of the polymer melts a Göttfert 2002 capillary rheometer is used in combination with a Haul-off apparatus. The polymer material is added to the barrel of the capillary rheometer at 185° C. To create molten polymer strands, the melt is pushed out of the barrel by a piston with a diameter of 12 mm and a die of 2 mm at a piston speed of 0.05 mm $s^{-1}$. The molten strands are attached to the Haul-off apparatus which spins the molten strands on a wheel, rotating at a pull-off speed of 100 mm $s^{-1}$. The speed is linearly increased at an acceleration of 0.12 mm $s^{-1}$ till the polymer melt breaks.

TABLE 1

Results of co-polymerisation of L(D)-LD with D-LD or L(D)-EG by ROP, weight-average molecular weight ($M_w$) (kg $mol^{-1}$) and polydispersity (D) determined by GPC, $T_g$ and $T_m$ (° C.) determined by DSC and zero shear viscosity $\eta_0$ (Pa s) and angular frequency at cross-over of G' and G" $\omega_c$ (rad $s^{-1}$) determined by SAOS.

| Polymer | Build-in %[a] Co-monomer | GPC $M_w$[b] (kg $mol^{-1}$) | GPC D | DSC $T_g$ (° C.) | DSC $T_m$ (° C.) | SAOS $\eta_0$ (kPa s) | SAOS $\omega_c$ (rad $s^{-1}$) |
|---|---|---|---|---|---|---|---|
| P(L-LD) | — | 135 | 1.7 | 58 | 177 | 9.7 | 62.9 |
| P(D-LD) | — | 117 | 1.7 | 57 | 179 | 12.1 | 84.5 |
| PLA Ingeo 7001D[c] | — | 83.3 | 1.5 | 58 | 149 | 5.9 | >100 |
| P(L-LD-co-D-LD) | 10* | 128 | 1.7 | 54 | — | 4.8 | >100 |
| P(L-LD-co-L-EG) 1 | 9.0 | 147 | 1.6 | 43 | 148 | 8.3 | >100 |
| P(L-LD-co-L-EG) 2 | 0.7 | 133 | 1.4 | 54 | 177 | 23.1 | 46.7 |
| P(L-LD-co-D-EG) 1 | 10.3 | 101 | 1.4 | 46 | 127 | 15.2 | 80.4 |
| P(L-LD-co-D-EG) 2 | 1.2 | 115 | 1.7 | 56 | 169 | 143.3 | 7.83 |
| P(L-LD-co-D-EG) 3 | 0.7 | 139 | 1.6 | 54 | 170 | 33.9 | 32.1 |
| P(L-LD-co-D-EG) 4 | 0.4 | 128 | 1.8 | 57 | 165 | 54.8 | 24.3 |
| P(D-LD-co-D-EG) 1 | 0.6 | 142 | 1.6 | 56 | 170 | 27.8 | 32.7 |
| P(D-LD-co-L-EG) 1 | 10.5 | 131 | 1.7 | 45 | 118 | 71.8 | 19.1 |
| P(D-LD-co-L-EG) 2 | 4.1 | 129 | 1.7 | 54 | 154 | 108.2 | 8.17 |
| P(D-LD-co-L-EG) 3 | 2.0 | 149 | 1.3 | 56 | 160 | 17.3 | 51.0 |
| P(D-LD-co-L-EG) 4 | 1.2 | 118 | 1.7 | 56 | 171 | 33.3 | 24.3 |
| P(D-LD-co-L-EG) 5 | 0.7 | 128 | 1.5 | 58 | 172 | 191.1 | 6.64 |
| P(D-LD-co-L-EG) 6 | 0.3 | 129 | 1.6 | 56 | 177 | 22.9 | 76.6 |
| P(L-LD) | — | 106 | 1.6 | 52 | 177 | 7.1 | >100 |
| P(L-LD-co-D-EG) | 1.2 | 119 | 1.9 | 59 | 170 | 14.8 | 55.9 |

[a]Average build-in % of methyl and methine protons (when both visible), determined by $^1$H-NMR (400 MHz, $CDCl_3$).

[b]Polystyrene standards were used to calibrate weight-average molecular weights ($M_w$). The experimental molecular weight was corrected considering the Mark-Houwink parameters for PLLA [Garlotta J. Polym. Environ. 9, 63-84 (2001)].

[c]Commercial grade PLA from NatureWorks

[d]Large scale polymerisation reactions (50-100 g)

*Added amounts before reaction, L- and D-LD cannot be distinguished from each other in $^1$H-NMR

The invention claimed is:

1. A method for producing a lactic acid-based polymer, the method comprising:

co-polymerizing a lactide with 0.2 mol % to 10 mol % of a cyclic dimer of an α-hydroxy acid as a co-monomer to obtain the lactic acid-based polymer, the lactide having a first α-carbon chirality, the α-hydroxy acid having an α-carbon chirality opposite the first α-carbon chirality, wherein the lactic acid-based polymer is a copolymer that exhibits an extensional force that is at least 1.5 times greater than that of a pure poly-lactic acid (PLA) polymer obtained by polymerization of the lactide.

2. The method according to claim 1, wherein the co-polymerization of the lactide with the cyclic dimer is a random co-polymerization.

3. The method according to claim 1, wherein:

the lactide is a (L,L)-lactide and the α-hydroxy acid is a (D,D)-diethylglycolide; or the lactide is a (D,D)-lactide and the α-hydroxy acid is a (L,L)-diethylglycolide.

4. The method according to claim 3, wherein the lactic acid based polymer is poly(lactic acid-co-α-hydroxybutyric acid).

5. The method according to claim 1, comprising co-polymerizing the lactide with from 0.4 mol % to 5 mol % of the cyclic dimer.

6. The method according to claim 1, comprising co-polymerizing the lactide with from 0.7 mol % to 2 mol % of the cyclic dimer.

7. The copolymer obtained by the method according to claim 1.

8. The copolymer according to claim 7, exhibiting a zero-shear viscosity as measured at 185° C., applying a strain amplitude of 1% to 10% and dynamic frequencies from 0.1 rade·$s^{-1}$ to 100 rade·$s^{-1}$ and calculated by a Carreau-Yasuda model fit that is at least 1.2 times greater that of a comparative copolymer obtained by co-polymerization of the lactide with a cyclic dimer of a comparative α-hydroxy acid as co-monomer, the comparative α-hydroxy acid being otherwise the same as the α-hydroxy acid while having an α-carbon chirality that is the same as first α-carbon chirality.

9. The copolymer according to claim 7, exhibiting an extensional force of at least 17 N, as measured by a force of a melt at 185° C., pushed through a die with a 2 mm diameter at a piston speed of 0.0 mm·$s^{-1}$ and spun on a rotating wheel at a pull-off speed of 100 mm·$s^{-1}$ and a linear acceleration of 0.12 mm·$s^{-1}$.

10. The copolymer according to claim 7, exhibiting a zero-shear viscosity of at least 15 kPa·s, as measured at 185° C., applying a strain amplitude of 1% to 10% and dynamic frequencies from 0.1 rade·$s^{-1}$ to 100 rade·$s^{-1}$ and calculated by a Carreau-Yasuda model fit.

11. The copolymer according to claim 7, exhibiting an extensional force of 15 N to 41 N, as measured by a force of a melt at 185° C., pushed through a die with a 2 mm diameter at a piston speed of 0.05 mm·$s^{-1}$ and spun on a rotating wheel at a pull-off speed of 100 mm·$s^{-1}$ and a linear acceleration of 0.12 mm $s^{-1}$.

12. The copolymer according to claim 7, exhibiting an extensional force of 23 N to 25.5 N, as measured by a force of a melt at 185° C., pushed through a die with a 2 mm diameter at a piston speed of 0.05 mm·$s^{-1}$ and spun on a rotating wheel at a pull-off speed of 100 mm·$s^{-1}$ and a linear acceleration of 0.12 mm·$s^{-1}$.

13. The copolymer according to claim 7, exhibiting a zero-shear viscosity of 15 kPa·s to 200 kPa·s, as measured at 185° C., applying a strain amplitude of 1% to 10% and dynamic frequencies from 0.1 rade·$s^{-1}$ to 100 rad·$s^{-1}$ and calculated by a Carreau-Yasuda model fit.

14. The copolymer obtained by the method of claim 1, wherein: the copolymer is a random copolymer;

the co-polymerization of the lactide with the cyclic dimer is a random co-polymerization;

the random copolymer comprises from 90 mol % to 99.6 mol % lactic acid monomer and from 10 mol % to 0.4 mol % α-hydroxy acid co-monomer; and the random copolymer has a melt strength of at least 15 N.

15. The random copolymer of claim 14, having a melt strength of 15 N to 40 N.

16. The random copolymer of claim 14, having a melt strength of 20 N to 35 N.

17. The random copolymer of claim 14, having a melt strength of 23 N to 25.5 N.

18. The random copolymer according to claim 14, wherein the melt strength is measured by a force of a melt at 185° C., pushed through a die with a 2 mm diameter at a piston speed of 0.05 mm·$s^{-1}$ and spun on a rotating wheel at a pull-off speed of 100 mm·$s^{-1}$ and a linear acceleration of 0.12 mm·$s^{-1}$.

* * * * *